United States Patent
Hanif et al.

(10) Patent No.: US 10,778,282 B1
(45) Date of Patent: Sep. 15, 2020

(54) METHODS FOR IMPROVING FLEXIBILITY AND DATA RATE OF CHIRP SPREAD SPECTRUM SYSTEMS IN LORAWAN

(71) Applicant: Cisco Technology, Inc., San Jose, CA (US)

(72) Inventors: Muhammad Hanif, Saskatoon (CA); Ha Hoang Nguyen, Saskatoon (CA)

( * ) Notice: Subject to any disclaimer, the term of this patent is extended or adjusted under 35 U.S.C. 154(b) by 0 days.

(21) Appl. No.: 16/520,986

(22) Filed: Jul. 24, 2019

Related U.S. Application Data

(60) Provisional application No. 62/844,297, filed on May 7, 2019.

(51) Int. Cl.
  *H04B 1/7176* (2011.01)
  *H04B 1/7093* (2011.01)
  *H04B 1/69* (2011.01)

(52) U.S. Cl.
  CPC ......... *H04B 1/7176* (2013.01); *H04B 1/7093* (2013.01); *H04B 2001/6912* (2013.01); *H04B 2001/70935* (2013.01)

(58) Field of Classification Search
  CPC ........ H04B 1/69; H04B 1/707; H04B 1/7093; H04B 1/7176; H04B 2001/6912; H04B 2203/5441; H04B 3/54; H04L 27/103; H04L 7/06
  See application file for complete search history.

(56) References Cited

U.S. PATENT DOCUMENTS

| | | | | |
|---|---|---|---|---|
| 5,090,024 A | * | 2/1992 | Vander Mey | H04B 1/69 370/479 |
| 5,574,748 A | * | 11/1996 | Vander Mey | H04B 1/69 370/447 |
| 5,748,670 A | | 5/1998 | Zastrow | |
| 8,526,483 B2 | * | 9/2013 | Choi | H04B 3/54 375/139 |
| 9,083,444 B2 | | 7/2015 | Schaffner | |
| 9,094,107 B1 | * | 7/2015 | Kumar | H04L 27/103 |

(Continued)

OTHER PUBLICATIONS

SemTech, "SX1276/77/78/79—137 MHz to 1020 MHz Low Power Long Range Transceiver," Aug. 2016.

(Continued)

*Primary Examiner* — Khanh C Tran
(74) *Attorney, Agent, or Firm* — Edell, Shapiro & Finnan, LLC

(57) ABSTRACT

A transmitter stores mappings of distinct values of an information signal to corresponding ones of distinct combinations of K chirps taken from M chirps that are different from each other, such that each of the distinct values is mapped to a corresponding one of the distinct combinations of K chirps. The transmitter receives a distinct value among the distinct values of the information signal. The transmitter selects, based on the mappings, a distinct combination of K chirps among the distinct combinations of K chirps that is mapped to the distinct value. The transmitter sums the K chirps of the distinct combination of K chirps to produce a symbol that represents the distinct value. The transmitter modulates the symbol to produce a modulated symbol, and transmits the modulated symbol. A receiver receives a modulated symbol that conveys a distinct value, and recovers the distinct value using stored mappings.

20 Claims, 8 Drawing Sheets

(56) References Cited

U.S. PATENT DOCUMENTS

| | | |
|---|---|---|
| 9,479,216 B2 | 10/2016 | Harrison et al. |
| 9,647,718 B2 | 5/2017 | Seller |
| 2008/0310479 A1 | 12/2008 | Koslar et al. |
| 2010/0039313 A1* | 2/2010 | Morris .................... G01S 7/006 342/25 F |
| 2016/0124075 A1* | 5/2016 | Vogt ...................... G01S 13/325 342/13 |
| 2019/0250264 A1* | 8/2019 | Belfiore .................... G01S 7/03 |
| 2019/0285725 A1* | 9/2019 | Roger ...................... G01S 7/032 |

OTHER PUBLICATIONS

H. L. Schneider, "Data transmission with FSK permutation modulation," The Bell System Technical Journal, vol. 47, pp. 1131-1138, Jul. 1968.

D. Slepian, "Permutation modulation," Proceedings of the IEEE, vol. 53, Issue 3, pp. 228-236, Mar. 1965.

T. Elshabrawy and J. Robert, "Interleaved Chirp Spreading LoRa-Based Modulation," IEEE Internet of Things Journal, Early Access, Jan. 2019.

Zorbas, Dimitrios et al., "Improving LoRa Network Capacity Using Multiple Spreading Factor Configurations", 10.1109/ICT.2018.8464901, Jun. 2018, 5 pages.

* cited by examiner

METHODS FOR IMPROVING FLEXIBILITY AND DATA RATE OF CHIRP SPREAD SPECTRUM SYSTEMS IN LORAWAN

PRIORITY CLAIM

This application claims priority to U.S. Provisional Patent Application No. 62/844,297, filed May 7, 2019, incorporated by reference herein in its entirety.

TECHNICAL FIELD

The present disclosure relates to generating and demodulating chirp spread spectrum signals.

BACKGROUND

Long range (LoRa) technology as used in a LoRa wide area network (WAN) (LoRaWAN) enables large communication coverage by using the technique of chirp spread spectrum (CSS). CSS is reasonably flexible in providing tradeoffs between reception sensitivity and throughput. Spreading factor (SF) is an important parameter in CSS modulation. Increasing SF can significantly extend the communication range, but it comes at the cost of a lower transmission rate. Another important parameter is the bandwidth (BW). Currently, three BW settings are available in LoRa systems: 125 kHz, 250 kHz, and 500 kHz. In general, providing different BW settings in LoRa modems results in expensive transceivers as additional hardware is required for the provision. Furthermore, there can be applications that require higher data rates than what can be supported using the maximum BW and lowest SF selection currently available with LoRa. A conventional frequency-shift keying (FSK) transceiver may be provided for such applications. Including an FSK transceiver adds hardware cost and software complexity.

DESCRIPTION OF EXAMPLE EMBODIMENTS

Overview

Figure 1:
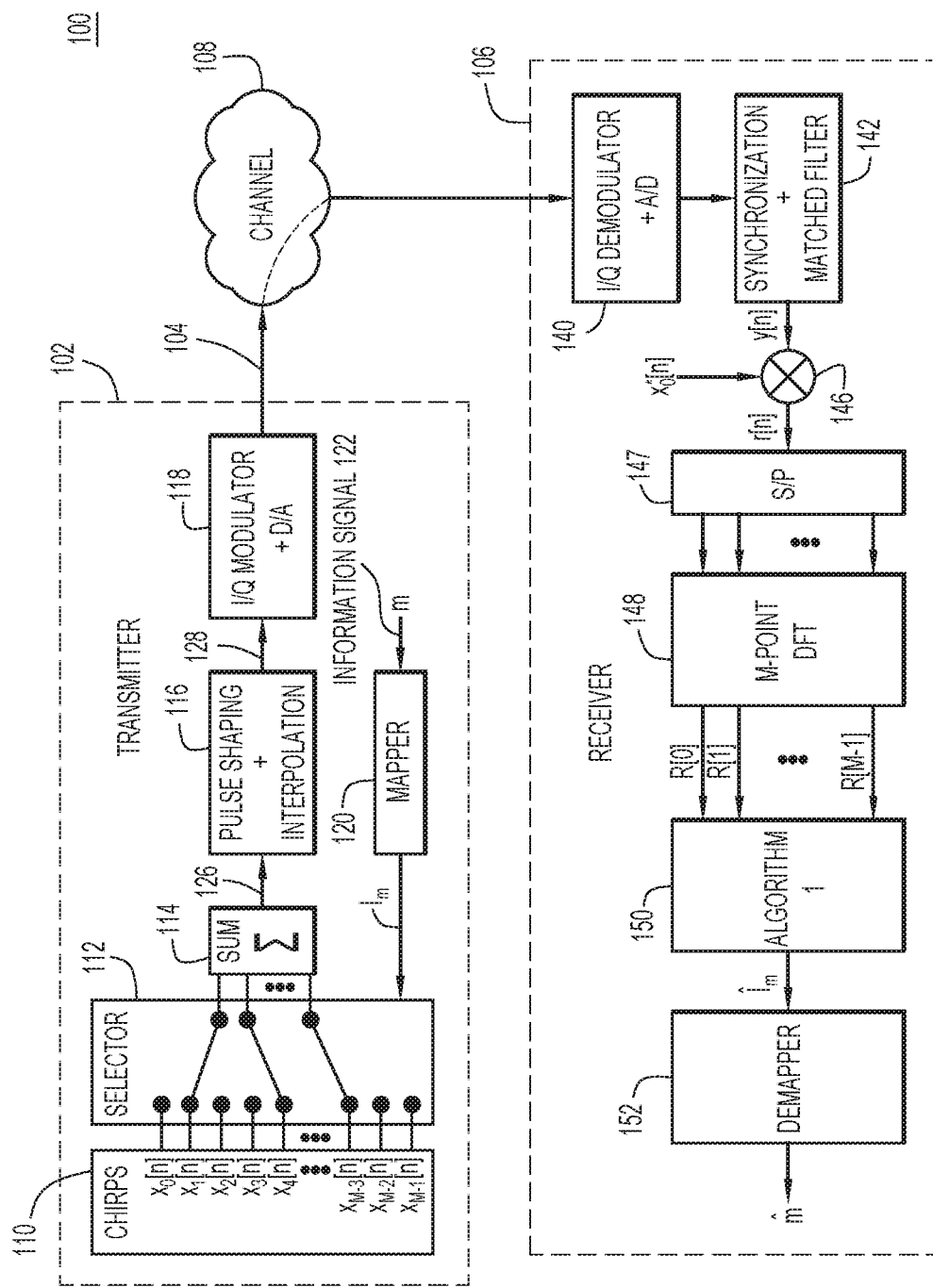
FIG. 1 is a block diagram of a CSS system (i.e., the "proposed CSS scheme") according to an example embodiment.

In a transmitter embodiment, a transmitter stores mappings of distinct values of an information signal to corresponding ones of distinct combinations of K chirps taken from M chirps that are different from each other, where M>K>=1, such that each of the distinct values is mapped to a corresponding one of the distinct combinations of K chirps. The transmitter receives a distinct value among the distinct values of the information signal. The transmitter selects, based on the mappings, a distinct combination of K chirps among the distinct combinations of K chirps that is mapped to the distinct value. The transmitter sums the K chirps of the distinct combination of K chirps to produce a symbol that represents the distinct value. The transmitter modulates the symbol to produce a modulated symbol, and transmits the modulated symbol.

In a receiver embodiment, a receiver stores mappings of distinct values of an information signal to corresponding ones of distinct combinations of K chirps taken from M chirps that are different from each other, where M>K>=1. The receiver receives a modulated version of a symbol that represents a distinct value among the distinct values as a summation of the K chirps of a distinct combination of K chirps among the distinct combinations of K chirps. The receiver dechirps the modulated version of the symbol to recover a dechirped symbol, and processes the dechirped symbol to produce an indication of the distinct combination of K chirps. Based on the mappings, the receiver demaps the indication of the distinct combination of K chirps to the distinct value.

Example Embodiments

The embodiments are described below first at a high-level, and then in detail. The embodiments are described with reference to a conventional CSS system so that advantages of the embodiments and their business values are readily understood.

The conventional CSS system (e.g., LoRa system) includes a transmitter and a receiver that use a set of $M=2^{SF}$ chirps, each carrying $SF=\log_2 M$ information bits. A chirp is a signal in which the frequency increases or decreases over time, i.e., which has a swept frequency that either increases or decreases with time. As such, a chirp is also called a sweep signal, and one chirp typically sweeps through the chirp bandwidth BW once (as in the LoRa system), or twice (as in the Institute of Electrical and Electronics Engineers (IEEE) 802.15.4a standard). When the instantaneous frequency of the sweep signal of the chirp reaches the highest, it will wrap-over and start from the lowest frequency. The transmitter operates as follows. First, each group of SF bits provided to an input of the transmitter is used to select one chirp (also known as a symbol) for transmission (i.e., there is a one-to-one mapping from a group of SF bits to one of M chirps). The receiver receives the transmission (i.e., the received signal) and performs quadrature demodulation, analog-to-digital conversion and synchronization operations on the received signal. A signal resulting from the aforementioned operations is processed by multiplying that signal with the conjugate of a basic chirp, followed by a discrete- Fourier transform (DFT). The DFT bin having the maximum magnitude identifies the chirp that was transmitted.

A main disadvantage of the conventional CSS system is its low data throughput. Embodiments presented herein alleviate this shortcoming by leveraging the technique of permutation modulation. The basic idea employed in the embodiments is that, instead of transmitting only one chirp in any given symbol duration, a sum of multiple chirps is transmitted. The number of chirps that are used in the sum is a system design parameter. In particular, if K out of M chirps are used in the sum, the total number of unique sums is precisely the number of combinations in taking K objects out of M objects, which is $$\hat{M} = \binom{M}{K} = \frac{M!}{K!(M-K)!}.$$

Depending on the choice of K, this number could be much greater than M, i.e., $\hat{M} \gg M$. Since the number of information bits that can be carried by each sum is $\lfloor \log_2 \hat{M} \rfloor$ this number can be much bigger than $SF=\log_2 M$, which means that a CSS system that operates in accordance with the embodiments can achieve a much higher data rate than the conventional CSS system. The embodiments also include a low-complexity DFT-based receiver that can detect the particular chirps that were used to generate the transmitted signal (i.e., the sum signal) at the transmitter, hence recovering the information bits.

Further details of the embodiments are now described. In the ensuing description, various embodiments may also each be referred to as a "proposed scheme."

With reference to FIG. 1, there is shown a simplified block diagram of an example CSS system 100 that operates according to the embodiments presented herein. The CSS system 100 includes a transmitter 102 that transmits chirps or symbols in a signal 104 to a receiver 106 through a communication channel 108. The transmitter 102 and the receiver 106 are also collectively referred to as a "proposed transceiver." The transmitter 102 includes memory to store a set 110 of M orthogonal chirps, a chirp selector 112, a summer 114, a pulse shaping and interpolation module 116, an In-phase/Quadrature (I/Q) modulator and digital-to-analog (D/A) converter module 118, and a mapper 120. First, a high-level description of the transmitter 102 is described. Then a mathematical treatment of operation of the transmitter will be provided. In the embodiment of FIG. 1, the M chirps (i.e., chirps 0 to M−1) are assigned corresponding ones of M indexes 0 to M−1 used to identify/indicate and access the chirps individually and in combinations. Thus, the M chirps may be represented by corresponding ones of the M indexes. The transmitter 102 includes mapper 120 that stores mappings of distinct values m (i.e., all of the values m are different from one another) of an information signal 122 to corresponding ones of distinct combinations of K chirps taken from the M chirps, such that each of the distinct values m is mapped to a corresponding one of the distinct combinations of K chirps. To do this, in the embodiment of FIG. 1, mapper 120 maps the distinct values m to corresponding ones of distinct combinations of K indexes, such that each of the distinct values m is mapped to a corresponding one of the distinct combinations of K indexes, and thus to a corresponding one of the distinct combinations of K chirps through the K indexes. This yields a total number of $$\frac{M!}{K!(M-K)!}$$

distinct values m and a corresponding total number of distinct combinations of K chirps.

In operation, mapper 120 receives one of the distinct values m of information signal 122, generates the distinct combination of K indexes, represented as $I_m$, that is mapped to the one of the distinct values m based on the mappings, and provides $I_m$ to selector 112 as a control input to the selector. Responsive to $I_m$, selector 112 simultaneously selects the distinct combination of K chirps corresponding to/represented by $I_m$ from the M chirps, and presents the K chirps simultaneously to parallel inputs of summer 114. In this way, selector 112 time-aligns the K chirps to be simultaneous with each other. Summer 114 sums the K simultaneous chirps to produce a transmit symbol 126 (also referred to simply as a "symbol") that represents the one of the distinct values m received by mapper 122. That is, the summation of the distinct combination of the K simultaneous chirps (i.e., symbol 126) represents the one of the distinct values m that is received by mapper 122. In the embodiment of FIG. 1, each of the M chirps includes a respective sequence of M complex samples/values (i.e., each chirp is represented as a complex-valued discrete-time signal), such that summer 114 performs a complex sample-wise (i.e., complex sample-by-complex sample) summation across the K simultaneous chirps, to produce symbol 126 as a complex-valued discrete-time symbol. That is, summer 114 sums the sequences of the complex values of the K chirps of the K simultaneous chirps to produce symbol 126.

Pulse shaping and interpolation module 116 includes (i) a pulse shaping filter, such as a root-raised cosine filter, to filter the complex-valued discrete-time symbol, and (ii) an interpolator to interpolate the complex-valued discrete-time signal, to produce a filtered, interpolated, complex-valued discrete-time symbol 128 (i.e., an interpolated version of the complex-valued discrete-time symbol). I/Q modulator and D/A converter module 118 includes (i) a complex D/A converter to convert complex-valued discrete-time symbol 128 to a complex-valued continuous-time symbol, and (ii) an I/Q (i.e., complex) modulator to modulate the complex-valued continuous-time symbol to produce a modulated symbol/chirp in signal 104.

The operation of the transmitter 102 is now described in detail with reference to the following mathematical treatment. The transmitter 102 uses the total of M orthogonal chirps for representing the information bits (e.g., information signal 122) provided to the transmitter. The M chirps in the set of chirps 110 are denoted as $x_0[n], x_1[n], \ldots, x_{M-1}[n]$ (in the time domain). The basic chirp is denoted by a sequence or series of M complex samples (also referred to as complex values) $x_0[n]$, given as $$x_0[n] = \exp\left\{j2\pi\left(\frac{n^2}{2M} - \frac{n}{2}\right)\right\}, n = 0, 1, \ldots, M-1. \quad (1)$$

The remaining chirps are related to the basic chirp as $$x_k[n] = x_0[n+k], k=0,1,\ldots,M-1, \quad (2)$$

Note that $x_0[n]$ is periodic with period M, i.e., $x_0[n+M]=x_0[n]$. Therefore, all the chirps can be generated by cyclic shifts of $x_0[n]$.

Figure 2A:
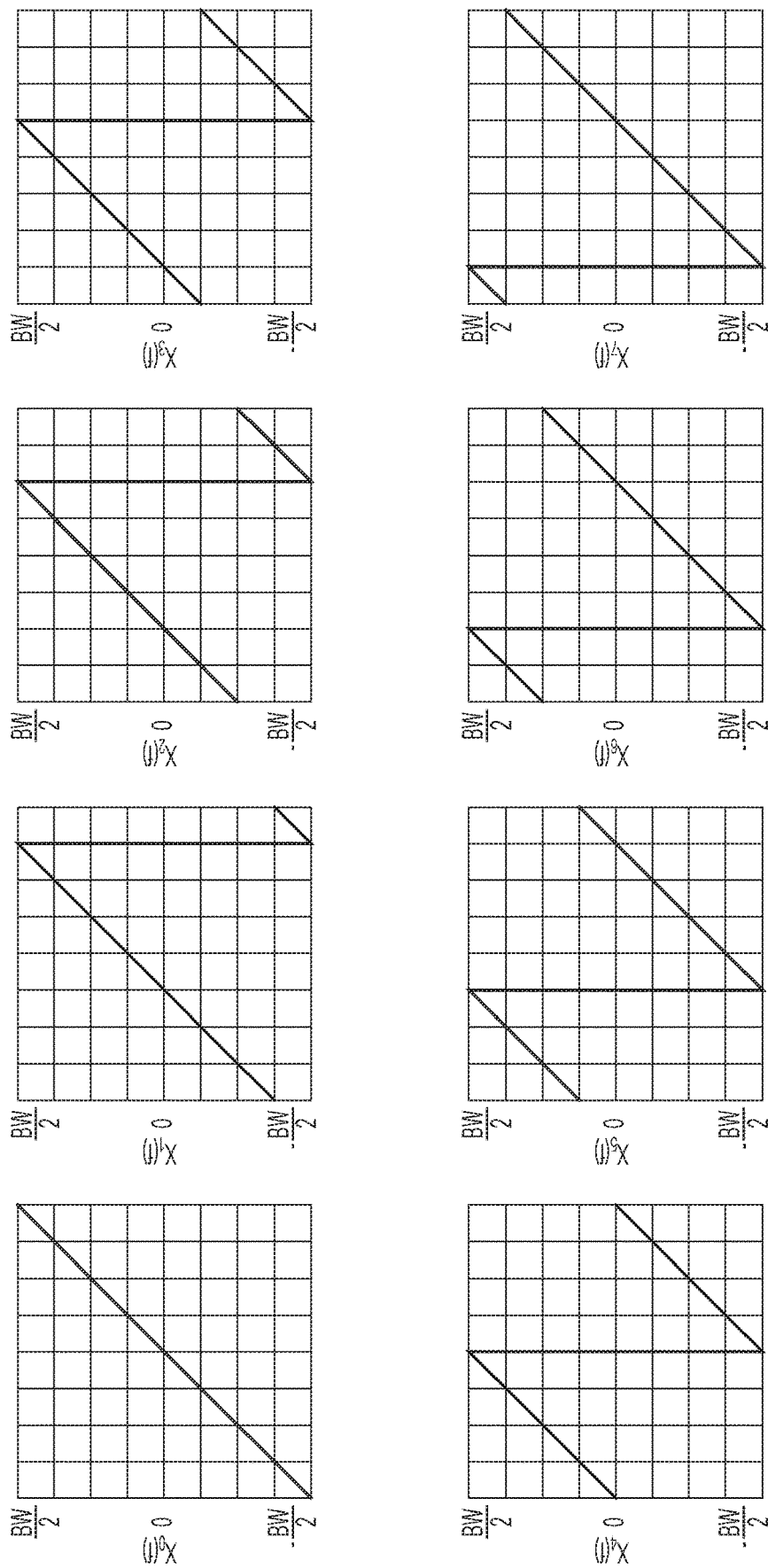
FIG. 2A shows frequency spectrums of eight chirps used in the CSS system, according to an example embodiment.

FIG. 2A shows chirp frequency spectrums $X_0(f)$, $X_1(f)$, $X_2(f)$, $X_3(f)$, $X_4(f)$, $X_5(f)$, $X_6(f)$, and $X_7(f)$ for time domain chirps, $x_0[n]$, $x_1[n]$, $x_2[n]$, $x_3[n]$, $x_4[n]$, $x_5[n]$, $x_6[n]$, and $x_7[n]$, respectively. In the frequency spectrums of FIG. 3, "n" represents a sample-time index. As shown in FIG. 2A, chirp frequency spectrums $X_1(f)$, $X_2(f)$, $X_3(f)$, $X_4(f)$, $X_5(f)$, $X_6(f)$, and $X_7(f)$ represent respective, successively, cyclically frequency-shifted versions of the basic chirp frequency spectrum $X_0(f)$, for which the successive cyclic frequency shifts are equal to each other.

As described above in connection with FIG. 1, the first step in the transmission process of the proposed scheme is mapping a group of information bits to a symbol, as provided by mapper 120. In the proposed scheme, every group of $\Lambda$ bits is mapped to one transmit symbol. Let $b_0$, $b_1, \ldots, b_{\Lambda-1}$ be transmitted bits. Then, m is defined to be the corresponding decimal number, i.e., $$m = \sum_{i=0}^{\Lambda-1} b_i 2^i.$$

Note that $0 \le m \le 2^{\Lambda}-1$.

The transmitter 102 uses a total of K chirps simultaneously to represent m. In particular, for every (distinct) value of m between 0 and $2^{\Lambda}-1$, the transmitter assigns a unique and distinct combination of K chirps. Specifically, let a distinct combination or set of indexes $I_m$, with $|I_m|=K$, denote the index set of the chirps corresponding to the message m. Then the transmitted signal (i.e., symbol) corresponding to the message m is constructed as $$s_m[n] = \frac{1}{\sqrt{K}} \sum_{l \in I_m} x_l[n]. \quad (3)$$

Since there is a total of $$\binom{M}{K} = \frac{M!}{K!(M-K)!}$$

combinations of K chirps out of M chirps, the number of bits that are mapped to (carried by) one symbol is given as:

$$\Lambda = \lfloor \log_2(\binom{M}{K}) \rfloor. \quad (4)$$

It is pointed out that the conventional CSS system (e.g., LoRa system) corresponds to the choices of $M=2^{SF}$, $K=1$, $I_m=\{m\}$, and $\Lambda=SF$. In contrast, in the proposed scheme, the number of chirps M need not to be a power of 2.

Consider a simple example for M=8. In the conventional CSS system, a total of 8 different messages can be transmitted. Since $I_m=\{m\}$ for $m=0, 1, \ldots, 7$, Equation (Eq.) (3) simplifies to $$s_m[n]=x_m[n]. \quad (5)$$

In the proposed scheme, if K=2 is chosen, there are a total of $\binom{M}{K}=\binom{8}{2}=28$ combinations of two chirps. Consequently, $\Lambda = \lfloor \log_2(28) \rfloor = 4$. This means that the transmitter 102 can transmit 4 bits instead of 3 bits in every symbol when two chirps are selected simultaneously. This translates to a data-rate improvement of 33%.

Table 1 below shows all 28 combinations corresponding to a selection of 2 out of 8 chips.

TABLE 1

| No. | Pattern |
| --- | --- |
| 0 | 11000000 |
| 1 | 10100000 |
| 2 | 10010000 |
| 3 | 10001000 |
| 4 | 10000100 |
| 5 | 10000010 |
| 6 | 10000001 |
| 7 | 01100000 |
| 8 | 01010000 |
| 9 | 01001000 |
| 10 | 01000100 |
| 11 | 01000010 |
| 12 | 01000001 |
| 13 | 00110000 |
| 14 | 00101000 |
| 15 | 00100100 |
| 16 | 00100010 |
| 17 | 00100001 |
| 18 | 00011000 |
| 19 | 00010100 |
| 20 | 00010010 |
| 21 | 00010001 |
| 22 | 00001100 |
| 23 | 00001010 |
| 24 | 00001001 |
| 25 | 00000110 |
| 26 | 00000101 |
| 27 | 00000011 |

In Table 1, a "1" in a row corresponds to a selection of the corresponding chirp. Since $\Lambda=4$, only the first $2^{\Lambda}=16$ patterns are selected for transmission and reception. Note that the combination of indexes $I_m$ can be found easily from the pattern. For example, $I_m$ corresponding to the pattern 10000100 is $I_m=\{0,5\}$. Thus, the distinct bit pattern 10000100 is mapped to the distinct combination of $I_m$ 0,5, which is in turn mapped to the distinct combination of K=2 chirps $x_0[n]$, $x_5[n]$.

Figure 2B:
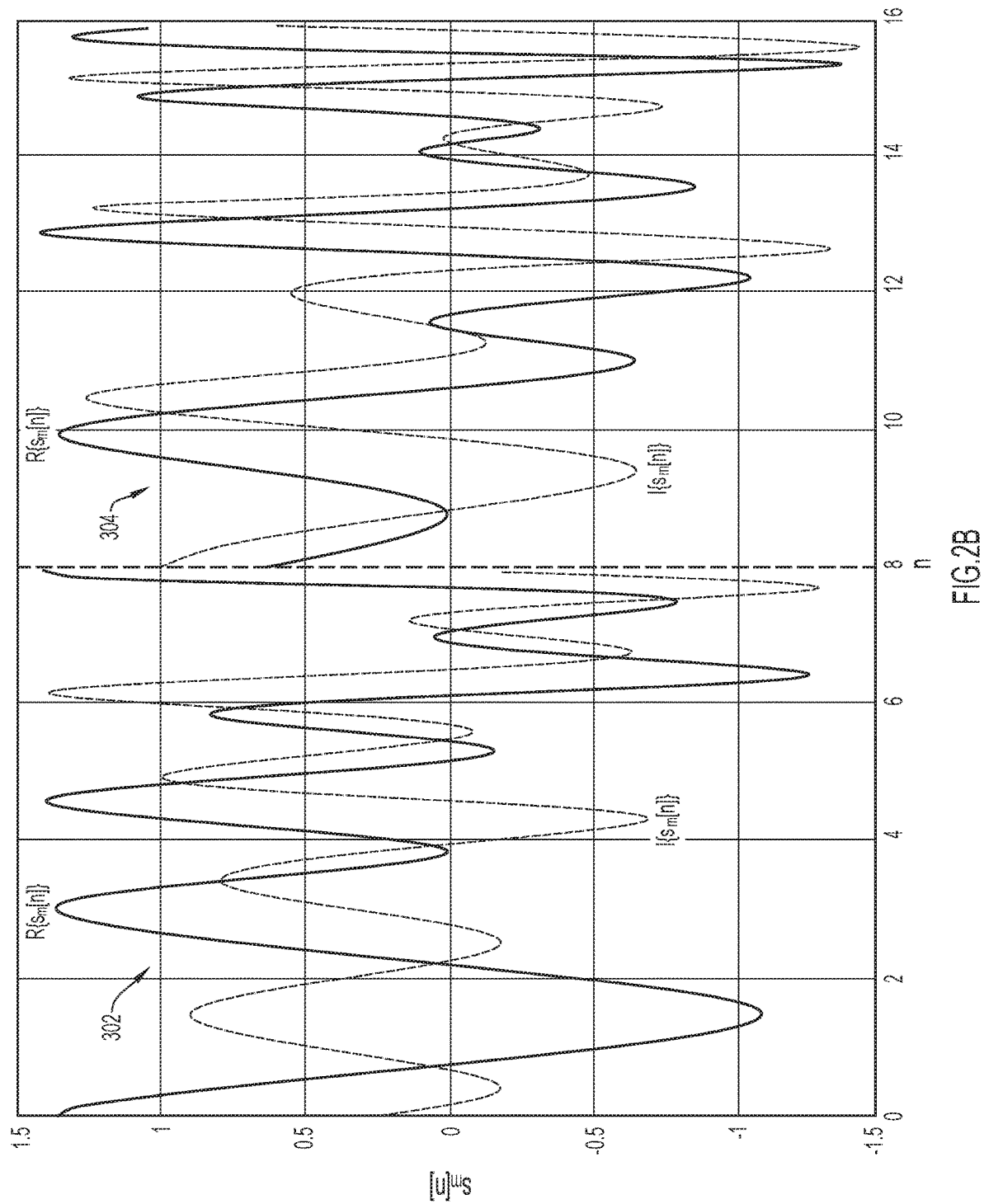
FIG. 2B is an illustration of a transmitted signal including two symbols for the CSS system, according to an example embodiment.

With reference to FIG. 2B, there is an illustration of an example of a sequence of two symbols generated by the transmitter 102, e.g., at the output of summer 114 or at the output of pulse shaping and interpolation module 116, for the case (M=8) (i.e., SF=3) and K=2. Here the first symbol 302 (which may represent symbol 126 or symbol 128, for example) is $s_m[n]=$ $$s_m[n] = \frac{1}{\sqrt{2}}(x_0[n] + x_5[n]),$$

and the second symbol 304 is $$s_m[n] = \frac{1}{\sqrt{2}}(x_3[n] + x_6[n]).$$

Each symbol 302, 304 is complex and includes a real component/waveform shown in solid line and an imaginary component/waveform shown in dashed line. Equivalently, $I_m=\{0,5\}$ and $I_m=\{3,6\}$ for the first and second symbols, respectively. Note that $s_m[n]$ is a complex-valued discrete-time signal, which is converted to a continuous-time signal and modulated by I/Q modulator and D/A module 118 before transmission to the channel.

Table 2 below shows the number of bits in a multiple-chirp symbol and a percentage of data-rate improvement. Table 2 tabulates the number of bits that symbol can carry in the proposed scheme for different values of M when K chirps are selected for transmission. Note that with conventional CSS (e.g., LoRa) modulation, K=1, and total of SF=log$_2$(M) bits are transmitted per symbol, as also shown in Table 2. Also indicated in Table 2 is the percentage of data-rate improvement gained through selecting K chirps instead of 1 chirp only. For example, for SF=12 and K=3, one symbol can convey a total of 33 bits instead of only 12 bits when only one chirp is selected. In other words, the data rate is now 2.75 times the data rate achievable by the conventional CSS modulation.

TABLE 2

| SF = log$_2$ M | K | | | | | | | | |
|---|---|---|---|---|---|---|---|---|---|
| | 1 | 2 | | 3 | | 4 | | 5 | |
| 7 | 7 | 12 | 171% | 18 | 257% | 23 | 329% | 27 | 386% |
| 8 | 8 | 14 | 175% | 21 | 263% | 27 | 338% | 33 | 413% |
| 9 | 9 | 16 | 178% | 24 | 267% | 31 | 344% | 38 | 422% |
| 10 | 10 | 18 | 180% | 27 | 270% | 35 | 350% | 43 | 430% |
| 11 | 11 | 20 | 182% | 30 | 273% | 39 | 355% | 48 | 436% |
| 19 | 12 | 22 | 183% | 33 | 275% | 43 | 358% | 53 | 442% |

Referring again to FIG. 1, first, a high-level description of the receiver 106 is described, then a mathematical treatment of the operation of the receiver 106 will be provided. The receiver 106 stores at least the basic chirp x$_0$[n] of the total set of M chirps used at the transmitter 102, but may also store all of the M chirps. Like the transmitter 102, the receiver 106 also stores mappings of the distinct values m of the information signal 122 to the corresponding ones of distinct combinations of K frequency chirps (also referred to as "chirps") taken from the M chirps. The receiver 106 may store the aforementioned mappings, indirectly, as mappings of the distinct values m to the corresponding ones of the distinct combinations of K indexes, which represent indirect mappings from the distinct values m to the distinct combinations of K indexes, as described above in connection with the transmitter 102.

In operations, the receiver 106 receives a signal including a modulated symbol transmitted by the transmitter 102. As mentioned above, the modulated symbol is a modulated version of a symbol that represents one of the distinct values m as a summation of the K (simultaneous) chirps of the one of the distinct combinations of K chirps that is mapped to the one of the distinct values. The signal including the modulated symbol is provided to an I/Q demodulator and analog-to-digital (A/D) module 140 of the receiver. I/Q demodulator and analog-to-digital (A/D) module 140 includes (i) a quadrature down-converter to demodulate and frequency-downconvert the signal to a complex-valued continuous-time signal (e.g., at baseband), and (ii) a complex A/D converter to convert the complex-valued continuous-time signal to a complex-valued discrete-time signal. A synchronization and matched filter module 142 of the receiver 106 performs matched filtering of the complex-valued discrete-time signal, and synchronizes receiver phase and timing to the complex-valued discrete-time signal, to produce a signal y[n]. Signal y[n] represents a dechirped signal from which the frequency sweep has been removed and that retains information from/associated with (e.g., contained in) the symbol.

Receiver 106 includes a multiplier 146 to multiply the complex conjugate of the basic chirp by the signal y[n] that retains the information from the symbol, to produce a resulting signal r[n] including a sequence of samples/values.

A serial-to-parallel (S/P) converter 147 of the receiver 106 converts the sequence of samples of r[n] to M parallel samples and provides them to parallel inputs of a DFT module 148. DFT module 148 performs an M-point DFT on the M parallel samples of r[n], to produce an M-point DFT having complex (DFT) amplitudes R[0], R[1], . . . , R[M−1] in corresponding frequency bins having corresponding indexes 0, 1, . . . , M−1. An algorithm module 150 executes an algorithm "Algorithm 1" that processes the DFT amplitudes along with the complex conjugate of the basic chirp, to produce an indication of the one of the distinct combinations of K chirps that is mapped to the one of the distinct values conveyed by the symbol. In the embodiment of FIG. 1, the indication represents the one of the distinct combinations of K indexes, e.g., I$_m$, that corresponds to the one of the distinct combinations of K chirps and that, in turn, is mapped to the one of the distinct values m conveyed in the symbol. The algorithm module 150 provides the indication, e.g., I$_m$, to a demapper 152 of the receiver 106. As described below, to determine the set of indexes I$_m$, Algorithm 1 successively determines individual indexes belonging to I$_m$ (i.e., constructs the set of indexes I$_m$, one index at a time) using a recursive algorithm that, for each current iteration of the algorithm, selects/identifies one index of I$_m$.

Demapper 152 stores the mappings described above. Demapper 152 demaps the indication I$_m$ provided by algorithm module 150 to the one of the distinct values m conveyed in the symbol based on the stored mappings, and outputs the one of the distinct values m. In other words, demapper 152 translates the indication I$_m$ to m.

The operation of the receiver 106, in particular, Algorithm 1, is now described in detail with reference to the following mathematical treatment. In a frequency-flat channel with an equivalent complex baseband channel gain h (which is typically less than one, indicating path or transmission loss), the maximum-likelihood (ML) detection for transmission in the proposed scheme is given as $$\hat{m} = \underset{m}{\operatorname{argmin}} \left\| y - \frac{h}{\sqrt{K}} \sum_{l \in I_m} x_l \right\|^2, \tag{6}$$

where y=[y[0] y[1] . . . y[M−1]], x$_l$=[[x$_l$[0] x$_l$[1] . . . x$_l$[M−1]], y[n]=hs[n]+w[n] is the received signal, and w[n] is a circularly-symmetric Gaussian noise with variance N$_0$. Simplifying (6) gives $$\hat{m} = \underset{m}{\operatorname{argmax}} \mathfrak{R} \left\{ h^* y \sum_{l \in I_m} x_l^H \right\}, \tag{7}$$

where h* and x$_l^H$ are the conjugate and hermitian transposes of h and x$_l$, respectively, and $\mathfrak{R}\{\bullet\}$ denotes the real part of a complex number.

When a receiver (e.g., the receiver 106) does not have the knowledge of h, which is the case of practical interest, the receiver estimates m using the following non-coherent ML detection rule:

$$\hat{m} = \underset{m}{\operatorname{argmax}} \left| y \sum_{l \in I_m} x_l^H \right|. \tag{8}$$

Observe that $$x_l[n] = x_0[l]x_0[n]\exp\left(j\frac{2\pi l}{M}n\right).$$

Consequently, Eq. (8) can be written as $$\hat{m} = \underset{m}{\operatorname{argmax}}\left|\sum_{l\in I_m} x_0^*[l]\sum_{n=0}^{M-1} r[n]e^{-jk2\pi nl/M}\right| = \underset{m}{\operatorname{argmax}}\left|\sum_{l\in I_m} x_0^*[l]R[l]\right|, \quad (9)$$

where $r[n]=y[n]x_0^*[n]$, and $R[l]$, $l=0, 1, \ldots, M-1$, is the discrete Fourier transform (DFT) of $r[n]$.

It is pointed out that, for the conventional CSS modulation, $I_m = \{m\}$. Since $|x_0^*[m]|=1$, the detection rule in Eq. (9) becomes $$\hat{m} = \underset{m}{\operatorname{argmax}}|R[m]|. \quad (10)$$

In other words, the sampled received signal y[n] (after synchronization) is first multiplied by the conjugate of the basic chirp, and an M-point DFT is applied on the resultant signal. Afterwards, the message is demodulated by identifying the index of the peak absolute value of the DFT output. Unsurprisingly, this is exactly the same as the optimal non-coherent detection of CSS signals.

A case that is relevant to the proposed scheme is when K>1. In this case, an optimal receiver would require a search over all the patterns used at the transmitter to find $\hat{m}$ that maximizes $|\Sigma_{l\in I_m} x_0^*[l] R[l]|$ (which represents a correlated energy term or contribution). However, the optimal receiver consumes a high quantity of computational resources and memory. Accordingly, the proposed scheme includes a detection scheme in the receiver that significantly reduces both the computational complexity and memory.

The detection scheme finds $I_m$ in a recursive manner. In particular, the detection scheme estimates/determines the elements (denoted $l_i$) of $I_m$ one at a time. For example, for K=2, let $I_m=\{l_1, l_2\}$. The detection scheme first estimates $l_1$ as $$\hat{l}_1 = \underset{l}{\operatorname{argmax}}|R[l]|. \quad (11)$$

Note that (11) estimates $l_1$ exactly the same way as is done for the case K=1 (see (10)). Once $l_1$ is estimated, $l_2$ can be estimated/determined in a next iteration using Eq. (9) as $$\hat{l}_2 = \underset{l}{\operatorname{argmax}}\left|x_0^*[\hat{l}_1]R[\hat{l}_1] + x_0^*[l]R[l]\right|. \quad (12)$$

Because the symbol of interest represents a summation of contributions from first and second chirps indexed by $l_1$ and $l_2$, the first term of the summation in Eq. (12) represents a known (chirp) contribution (e.g., a correlated energy contribution from the first chirp) of the first chirp (indexed by $l_1$) to the symbol representing m. The contribution is known because $l_1$, and thus the first chirp, was determined at Eq. (11). Accordingly, the summation in Eq. (12) takes into account, i.e., effectively removes, the known contribution of the known first chirp (indexed by $l_1$) from the combined contributions of the first and second chirps to a total energy of the symbol, which permits the remaining unknown index $l_2$ of the second chirp to be estimated/determined in the next iteration.

For K>2, the detection scheme is carried out similarly. In particular, the elements of $I_m=\{l_1, l_2, \ldots, l_K\}$ are detected one at a time recursively as $$\hat{l}_1 = \underset{l}{\operatorname{argmax}}|x_0^*[l]R[l]| = \underset{l}{\operatorname{argmax}}|R[l]|, \quad (13)$$

and $$\hat{l}_{k+1} = \underset{l}{\operatorname{argmax}}\left|x_0^*[l]R[l] + \sum_{m=1}^{k} x_0^*[\hat{l}_m]R[\hat{l}_m]\right|, \quad (14)$$

for k=1, 2, ..., K−1.

In Eq. (14), the second term, i.e., the summation term, represents the total contribution to the symbol of all chirps having indexes that were determined in previous iterations. As described above, the summation (which may be a subtraction) removes the known contributions, which leaves the unknown contribution from which the unknown index may be determined. In other words, each iteration removes the known contributions (which increase through each iteration) so that the unknown contribution may be determined.

Algorithm 1 below shows example pseudocode for the detection scheme, which is also labelled in FIG. 1, i.e., in algorithm module 150. Here, a recursive function INDEXSETESTIMATOR is used to describe the aforementioned recursive method.

Figure 3:
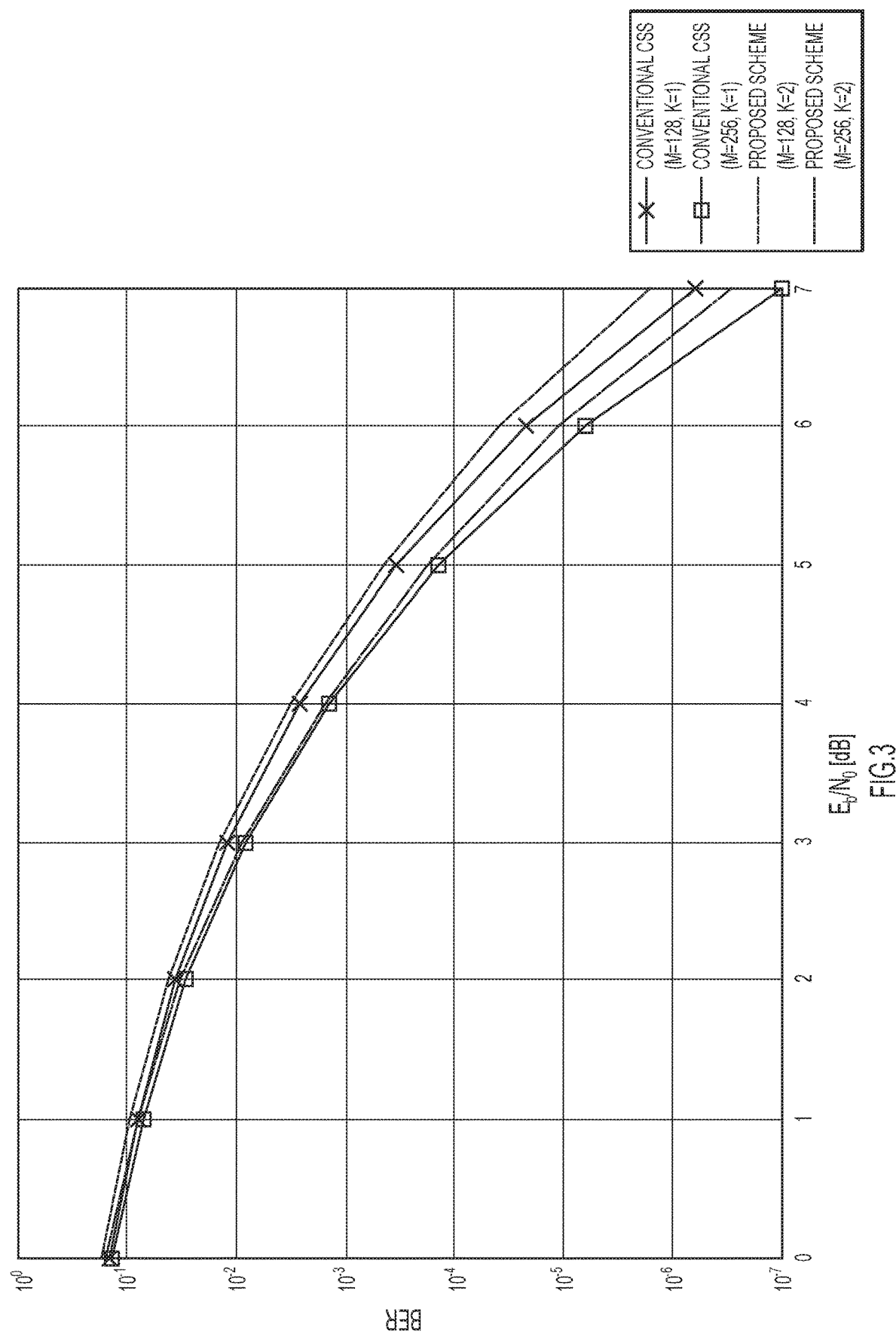
FIG. 3 is a plot of a bit error rate (BER) comparison of a conventional CSS scheme and the proposed CSS scheme for are spreading factor (SF)=7, 8 (equivalently, M=128, 256, where M is a total number of chirps in a set of available chirps) and K=1, 2 (wherein K is a number of chirps of the M chirps that are summed), according to an example embodiment.

Algorithm 1 Low-Complexity Detection Algorithm of the Proposed Flexible CSS Modulation Scheme.
Input: K, y[n] for n=0, 1, ..., M−1
Output: $\hat{I}_m$
 1: Compute $r[n]=y[n]x_0^*[n]$ for n=0, 1, ..., M−1
 2: Compute $\mathcal{R}$ =DFT([r[0] r[1] ... r[M−1]])
 3: $\hat{I}_m \leftarrow$ INDEXSETESTIMATOR($\mathcal{R}$, K)
 4: function INDEXSETESTIMATOR($\mathcal{R}$, K)
 5: if K=1 then
 6: return {argmax$_l$|R[l]|}
 7: else
 8: $\{\hat{l}_1, \ldots, \hat{l}_{K-1}\} \leftarrow$ INDEXSETESTIMATOR($\mathcal{R}$, K−1)
 9: $\hat{l}_K$=argmax$_l$|$x_0^*$[l]R[l]+$\Sigma_{m=1}^{K-1} x_0^*[\hat{l}_m]R[\hat{l}_m]$|
 10: return $\{\hat{l}_1, \ldots, \hat{l}_K\}$
 11: end if
 12: end function The proposed scheme can be used to improve the bit error rate (BER) performance of the conventional CSS modulation. To demonstrate this advantage, FIG. 3 shows the BER performance of the conventional scheme (K=1) and the proposed scheme (K=2) for SF=7, 8 (or M=128, 256). Observe that, in either the conventional scheme (e.g., conventional LoRa) or the proposed scheme, the BER performance is better when a higher number of chirps is used (M=256 versus M=125). On the other hand, in either scheme (conventional or proposed), the data rate is 1.75 times when M=128 is used instead of M=256.

An important observation from FIG. 3 is that, while the two schemes with (M, K)=(128, 1) and (M, K)=(256, 2) deliver the same data rate, the proposed scheme with (M, K)=(256, 2) performs better than the conventional scheme with (M, K)=(128, 1) in terms of BER at moderate to high $E_b/N_0$ values.

The proposed scheme can increase the highest achievable data rate of the conventional CSS modulation with only slight degradation in BER. To see this, consider again FIG. 3, where the BER curve of the proposed scheme with (M, K)=(128, 2) is plotted. Observe that the BER performance of the proposed scheme is only slightly worse than that of the conventional scheme with SF=7 (or M=128). However, the data rate achieved by the proposed scheme with (M, K)=(128, 2) is 12/7≈1.7143 times that of the maximum data rate achieved by the conventional scheme. As such, the improved scheme can be used to improve the data rate of the conventional scheme without affecting the BER performance significantly. It should be noted that the data rate can further be improved by using more chirps for transmission and reception, i.e., by using K>2.

Figure 4:
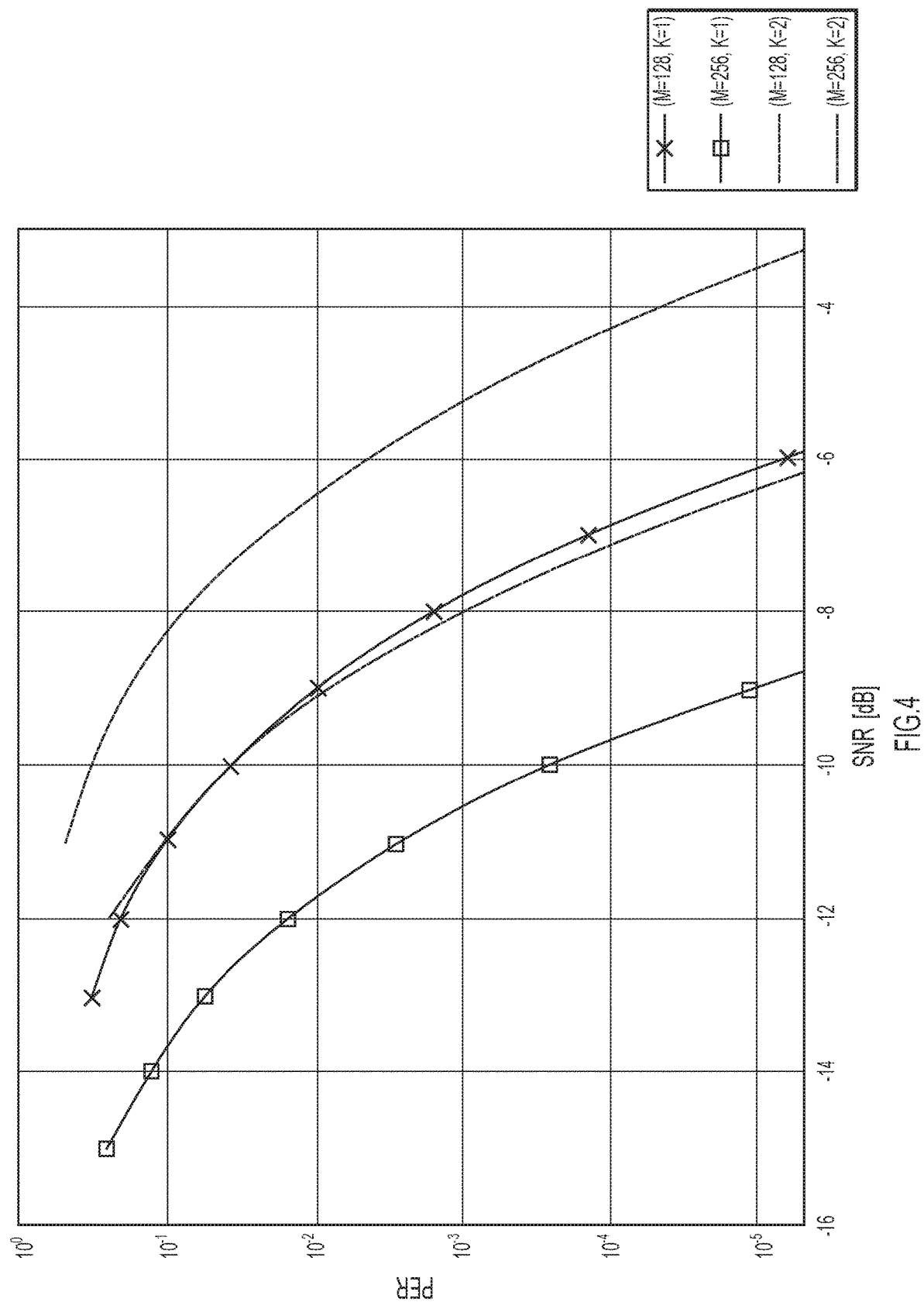
FIG. 4 is a plot of a packet error rate (PER) comparison of a conventional CSS scheme and the proposed CSS scheme for SF=7, 8 (equivalently, M=128, 256) and K=1, 2, according to an example embodiment.

The proposed scheme exhibits similar sensitivity as the conventional CSS modulation. As an illustration, consider FIG. 4, where the packet error rates (PERs) of both the conventional and proposed schemes are shown. Observe that the lower the data rate of a scheme, the better the scheme is in terms of PER, and vice versa. In FIG. 4, for example the scheme with (M, K)=(256, 1) has the lowest PER. At the same time, the first scheme has the lowest data rate, whereas the latter has the highest data rate amongst the four schemes under comparison. The scheme with (M, K)=(128, 1) and the scheme with (M, K)=(256, 2) have the same data rate and have almost the same PER performance against the channel Signal-to-Noise (SNR). That is, the improved scheme and the conventional scheme have similar reception sensitivity for the same data rate.

The proposed scheme can be used to transmit/receive conventional CSS signals, too. In particular, selecting only one chirp by $I_m=\{m\}$ results in the conventional CSS transmission/reception. This means that a CSS transceiver employing the proposed schemed (i.e., the proposed transceiver) can communicate with conventional CSS modulation-based transceivers. In other words, the proposed scheme has backward compatibility feature.

A wide range of achievable data rates can be obtained by changing the number of selected chirps, K, without changing the BW or SF. Since very minimum hardware changes are required to achieve variable data rates, the proposed CSS modulation can reduce the hardware costs of the existing CSS modulation-based transceivers.

Figure 5:
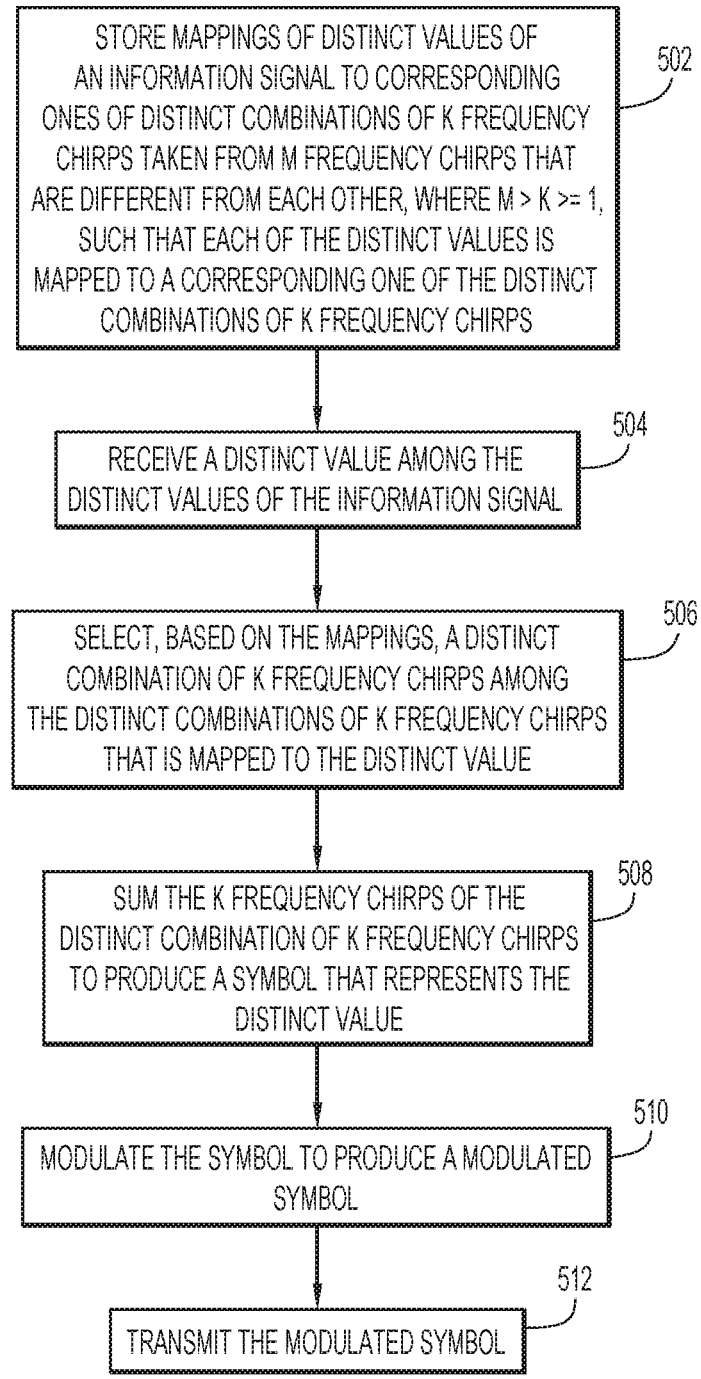
FIG. 5 is a flowchart of an example transmit method performed in the CSS system, according to an example embodiment.

With reference to FIG. 5, there is a flowchart of an example transmit method 500 that may be performed by the transmitter 102. Method 500 summarizes operations described above.

At 502, transmitter 102 maps (and stores resulting mappings of) distinct values (e.g., m) of an information signal to corresponding ones of distinct combinations of K chirps taken from M chirps that are different from each other, such that each of the distinct values is mapped to a corresponding one of the distinct combinations of K chirps. In an embodiment, M>K>=1 (e.g., M>K>2), and the M chirps include a basic chirp and M−1 chirps that represent respective cyclic shifts of the basic chirp. Also, the M chirps may employ a spreading factor SF according to the LoRa communication standard for a LoRaWAN, wherein $M=2^{SF}$ At 504, transmitter 102 receives a distinct value among the distinct values of the information signal.

At 506, transmitter 102 selects, based on the mappings, a distinct combination of K chirps among the distinct combinations of K chirps that is mapped to the distinct value.

At 508, transmitter 102 sums the K chirps of the distinct combination of K chirps to produce a symbol that represents the distinct value. Prior to being summed, the K chirps may be time-aligned to be simultaneous with each other when summed, such that the symbol represents a summation of the K simultaneous chirps.

At 510, transmitter 102 modulates the symbol to produce a modulated symbol. In an embodiment, prior to being modulated, the symbol may be filtered and interpolated.

At 512, transmitter 102 transmits the modulated symbol.

In an embodiment, the M chirps are represented in the transmitter 102 by corresponding ones of M indexes, and the mappings include mappings of the distinct values to corresponding ones of distinct combinations of K indexes taken from the M indexes, such that each of the distinct values is mapped to a corresponding one of the distinct combinations of K indexes. Also, at 506, the transmitter 102 selects a distinct combination of K indexes among the distinct combinations of K indexes that is mapped to the distinct value based on the mappings. Also, the transmitter accesses the distinct combination of K chirps using the distinct combination of K indexes, and then, at 508, sums the K chirps to produce the symbol.

Figure 6:
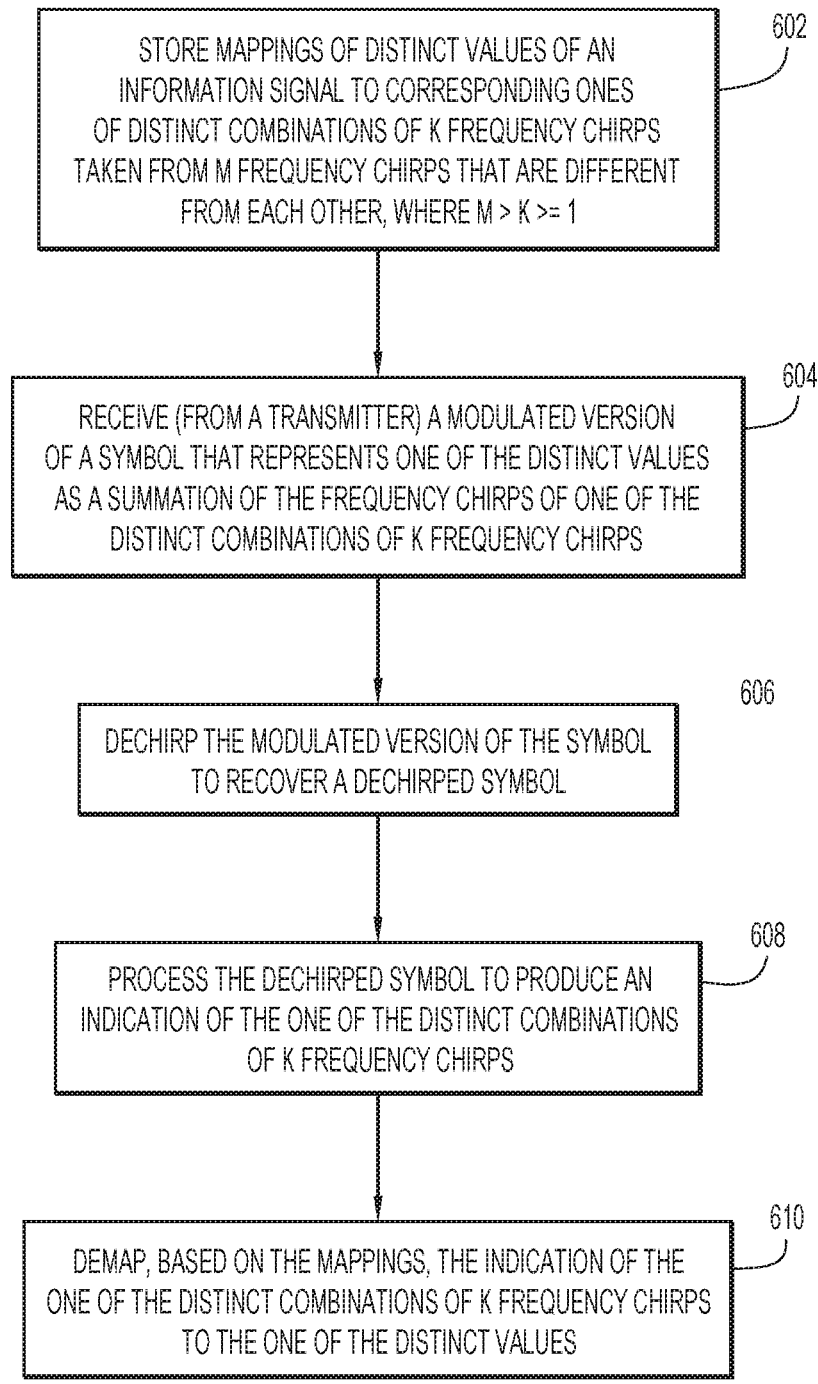
FIG. 6 is a flowchart of an example receive method performed in the CSS system, according to an example embodiment.

With reference to FIG. 6, there is a flowchart of an example receive method 600 that may be performed by the receiver 106. Method 600 summarizes operations described above.

At 602, receiver 106 maps (and stores resulting mappings of) distinct values of an information signal to corresponding ones of distinct combinations of K chirps taken from M chirps that are different from each other. In an embodiment, M>K>=1 (e.g., M>K>2), and the M chirps include a basic chirp and M−1 chirps that represent respective cyclic shifts of the basic chirp.

At 604, receiver 106 receives a modulated version of a symbol that represents one of the distinct values (i.e., a distinct value among the distinct values) as a summation of the K chirps (which may be simultaneous) of one of the distinct combinations of K chirps (i.e., a distinct combination of K chirps among the distinct combinations of K chirps).

At 606, receiver 106 dechirps the modulated version of the symbol to recover a dechirped signal that retains information from the symbol.

At 608, receiver 106 processes the dechirped signal to produce an indication of the one of the distinct combinations of K chirps. To process the dechirped signal, the receiver 106 may: multiply the dechirped signal by a complex conjugate of the basic chirp to produce a resulting signal, generate a DFT of the resulting signal, wherein the DFT including complex DFT amplitudes in respective frequency bins of the DFT; and process the complex DFT amplitudes with the complex conjugate of the basic chirp to produce the one of the distinct combinations of K indexes. As described above, an algorithm to determine/estimate the distinct combination of K indexes based on the DFT may include successively determining indexes of the one of the distinct combinations of K indexes recursively by operating on the DFT amplitudes and the complex conjugate of the basic chirp. Assuming the symbol includes summed chirps having respective indexes, the algorithm successively determines each index taking into account, e.g., removing, correlated energy contributions to the symbol of the chirps indexed by previously determined indexes. For example, the algorithm (i) determines a first index of a first chirp summed into the symbol based on its correlated energy contribution to the symbol, (ii) determines a second index of a second chirp summed into the symbol taking into account the correlated energy contribution of the first chirp indexed by the first index to the symbol, (iii) determines a third index of a third chirp summed into the symbol taking into account the correlated energy contributions of both the first chirp indexed by the first index to the symbol and the second chirp indexed by the second index, and so on.

At 610, receiver 106 demaps, based on the mappings, the indication of the one of the distinct combinations of K chirps to the one of the distinct values.

In an embodiment, the M chirps are represented in the receiver 106 by corresponding ones of M indexes, and the mappings include mappings of the distinct values to corresponding ones of distinct combinations of K indexes taken from the M indexes, such that each of the distinct values is mapped to a corresponding one of the distinct combinations of K indexes. Also, the receiver 106 processes the dechirped signal to produce the indication as one of the distinct combinations of K indexes that is mapped to the one of the distinct values, then, the receiver demaps the one of the distinct combinations of K indexes to the one of the distinct values based on the mappings.

Figure 7:
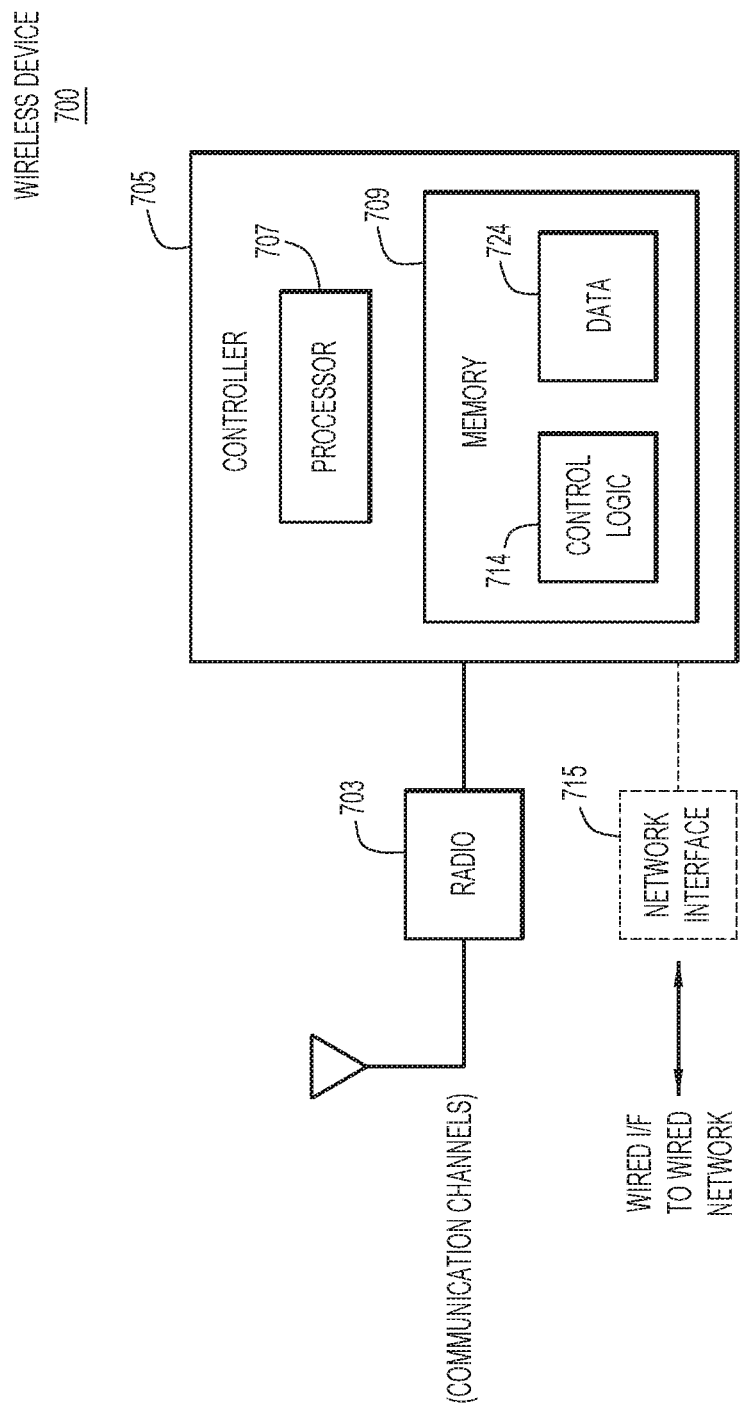
FIG. 7 is a block diagram of a wireless device configured to implement embodiments presented herein, according to an example embodiment.

With reference to FIG. 7, there is shown a block diagram of a wireless device 700 configured to implement embodiments presented herein, including transmitter 102, receiver 106, and their respective methods. Wireless device 700 includes a wireless radio 703 including a radio transmitter and a radio receiver to transmit and receive CSS signals in the form of modulated symbols/chirps. Radio 703 includes a respective set of one or more antennas. Radio 703 performs radio frequency and baseband signal processing, including various operations described above for the proposed scheme. Wireless device 700 may include a wired network interface 715 that enables the wireless device to connect to a wired network.

Wireless device 700 also includes a controller 705 having a processor 707 and memory 709. Processor 707 is a microcontroller or microprocessor, for example, configured to execute software instructions stored in memory 709. Memory 709 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 709 may comprise one or more computer readable storage media (e.g., a memory device) encoded with software comprising computer executable instructions and when the software is executed (by processor 707) it is operable to perform the operations described herein. For example, memory 709 stores or is encoded with instructions for control logic 714 to perform overall control of wireless device 700 and operations to implement the proposed scheme in both transmit and receive directions, e.g., to generate symbols from values of an information signal and to demodulate symbols to recover the values from the symbols as described above. Operations for the proposed scheme may be shared across radio 703 and controller 705 (i.e., control logic 714).

Memory 709 also stores information/data 724 used and generated by control logic 714. Such data includes the M chirps and mappings of the chirps to values of an information signal and to indexes. The data also includes correlation values, DFT amplitudes/values, complex conjugates of chirps, and so on.

In summary, embodiments presented include a highly-flexible scheme (i.e., the proposed scheme) for a CSS system, e.g., a LoRa modem/transceiver. The proposed scheme supports a wide range of data rates with minimal hardware changes.

Embodiments of the proposed scheme improve the data throughput of a CSS (e.g., LoRa) modem. The embodiments are directed to a CSS system that includes a transmitter and a receiver. The transmitter transmits a signal including a sum of multiple concurrent chirps (i.e., a sum signal) in any given symbol duration to convey information bits, to achieve a much higher data rate compared to a transmitter that transmits only a single chirp in the given symbol duration. The receiver employs a low-complexity DFT to detect the particular chirps that were used to generate the transmitted signal (i.e., the sum signal) at the transmitter, hence recovering the information bits. The embodiments improve the throughput without increasing the BW. Thus, the embodiments greatly reduce the hardware cost and complexity. Furthermore, the embodiments enable high data rates as supported by an FSK modem. Consequently, the embodiments eliminate hardware and software modules dedicated to FSK transmission and reception, resulting in a reduced hardware cost and software complexity.

The proposed scheme offers several key advantages. First, the proposed scheme generalizes the conventional CSS-based transmission/reception. For example, the proposed transceiver can transmit and receive conventional CSS signals when it uses only one chirp to convey information bits; however, by using multiple chirps, the proposed transceiver can bring significant improvements in the achievable data rate without affecting the BER performance significantly. Second, the proposed scheme for data-rate improvement is all digital, so that permits adjustment of data rates in a digital way. The proposed scheme only requires modification of the transmission and reception algorithms, and only slight hardware modifications. Last, the proposed scheme can eliminate the provision of an FSK modem in the conventional LoRa systems by enabling higher data rates for a given BW and SF setting. Hence, the proposed scheme can reduce the hardware cost and software complexities of the existing LoRa modem chips.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided comprising: storing mappings of distinct values of an information signal to corresponding ones of distinct combinations of K chirps taken from M chirps that are different from each other, where M>K>=1, such that each of the distinct values is mapped to a corresponding one of the distinct combinations of K chirps; receiving a distinct value among the distinct values of the information signal; selecting, based on the mappings, a distinct combination of K chirps among the distinct combinations of K chirps that is mapped to the distinct value; summing the K chirps of the distinct combination of K chirps to produce a symbol that represents the distinct value; modulating the symbol to produce a modulated symbol; and transmitting the modulated symbol.

In another form, an apparatus is provided comprising: a controller configured to: store mappings of distinct values of an information signal to corresponding ones of distinct combinations of K chirps taken from M chirps that are different from each other, where M>K>=1, such that each of the distinct values is mapped to a corresponding one of the distinct combinations of K chirps; receive a distinct value among the distinct values of the information signal; select, based on the mappings, a distinct combination of K chirps among the distinct combinations of K chirps that is mapped to the distinct value; sum the K chirps of the distinct combination of K chirps to produce a symbol that represents the distinct value; and modulate the symbol to produce a modulated symbol; and a radio to transmit the modulated symbol.

In yet another form, a non-transitory computer readable medium encoded with instructions is provided. The instructions, when executed by a processor, cause the processor to perform: storing mappings of distinct values of an information signal to corresponding ones of distinct combinations of K chirps taken from M chirps that are different from each other, where M>K>=1, such that each of the distinct values is mapped to a corresponding one of the distinct combinations of K chirps; receiving a distinct value among the distinct values of the information signal; selecting, based on the mappings, a distinct combination of K chirps among the distinct combinations of K chirps that is mapped to the distinct value; summing the K chirps of the distinct combination of K chirps to produce a symbol that represents the distinct value; modulating the symbol to produce a modulated symbol; and transmitting the modulated symbol.

In a further form, a method is provided comprising: storing mappings of distinct values of an information signal to corresponding ones of distinct combinations of K chirps taken from M chirps that are different from each other, where M>K>=1; receiving a modulated version of a symbol that represents a distinct value among the distinct values as a summation of the K chirps of a distinct combination of K chirps among the distinct combinations of K chirps; dechirping the modulated version of the symbol to recover a dechirped signal that retains information contained in the symbol; processing the dechirped signal to produce an indication of the distinct combination of K chirps; and, based on the mappings, demapping the indication of the distinct combination of K chirps to the distinct value.

In yet another further form, an apparatus is provided comprising: a controller configured to perform: storing mappings of distinct values of an information signal to corresponding ones of distinct combinations of K chirps taken from M chirps that are different from each other, where M>K>=1; receiving a modulated version of a symbol that represents a distinct value among the distinct values as a summation of the K chirps of a distinct combination of K chirps among the distinct combinations of K chirps; dechirping the modulated version of the symbol to recover a dechirped signal that retains information contained in the symbol; processing the dechirped signal to produce an indication of the distinct combination of K chirps; and based on the mappings, demapping the indication of the distinct combination of K chirps to the distinct value.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   storing mappings of distinct values of an information signal to corresponding ones of distinct combinations of K chirps taken from M chirps that are different from each other, where M>K>=1, such that each of the distinct values is mapped to a corresponding one of the distinct combinations of K chirps;
   receiving a distinct value among the distinct values of the information signal;
   selecting, based on the mappings, a distinct combination of K chirps among the distinct combinations of K chirps that is mapped to the distinct value;
   summing the K chirps of the distinct combination of K chirps to produce a symbol that represents the distinct value;
   modulating the symbol to produce a modulated symbol; and
   transmitting the modulated symbol.

2. The method of claim 1, further comprising:
   prior to the summing, time-aligning the K chirps of the distinct combination of K chirps to be simultaneous with each other, to produce K simultaneous chirps,
   wherein the summing includes summing the K simultaneous chirps of the distinct combination of K chirps to produce the symbol.

3. The method of claim 1, wherein the M chirps include a basic chirp and M−1 chirps that represent respective cyclic shifts of the basic chirp.

4. The method of claim 1, wherein:
   the M chirps are represented by corresponding ones of M indexes;
   the mappings include mappings of the distinct values to corresponding ones of distinct combinations of K indexes taken from the M indexes, such that each of the distinct values is mapped to a corresponding one of the distinct combinations of K indexes;
   the selecting includes selecting a distinct combination of K indexes among the distinct combinations of K indexes that is mapped to the distinct value based on the mappings; and
   the method further comprises, prior to the summing, accessing the distinct combination of K chirps using the distinct combination of K indexes.

5. The method of claim 1, wherein a total number of the distinct combinations of K chirps and a corresponding total number of the distinct values are each given by $M!/(K!(M-K)!)$.

6. The method of claim 1, wherein the M chirps employ a spreading factor (SF) according to a Long Range (LoRa) communication standard for a LoRa wide area network (WAN), and wherein $M=2^{SF}$.

7. The method of claim 1, wherein:
   the M chirps are each represented by respective sequences of complex values; and
   the summing includes summing the sequences of the complex values of the K chirps of the distinct combination of K chirps to produce the symbol as a complex-valued discrete-time symbol represented by a sequence of complex values.

8. The method of claim 7, further comprising:
   converting the complex-valued discrete-time symbol to a complex-valued continuous-time symbol; and
   quadrature modulating the complex-valued continuous-time symbol to produce the modulated symbol.

9. The method of claim 8, further comprising:
   prior to the converting, interpolating the complex-valued discrete-time symbol to produce an interpolated version of the complex-valued discrete-time symbol,
   wherein the converting includes converting the interpolated version of the complex-valued discrete-time symbol, to produce the complex-valued continuous-time symbol.

10. An apparatus comprising:
    a controller configured to:
    store mappings of distinct values of an information signal to corresponding ones of distinct combinations of K chirps taken from M chirps that are different from each other, where M>K>=1, such that each of the distinct values is mapped to a corresponding one of the distinct combinations of K chirps;
receive a distinct value among the distinct values of the information signal;
select, based on the mappings, a distinct combination of K chirps among the distinct combinations of K chirps that is mapped to the distinct value;
sum the K chirps of the distinct combination of K chirps to produce a symbol that represents the distinct value; and
modulate the symbol to produce a modulated symbol; and
a radio to transmit the modulated symbol.

11. The apparatus of claim 10, wherein the controller is further configured to:
prior to summing the K chirps, time-align the K chirps of the distinct combination of K chirps to be simultaneous with each other, to produce K simultaneous chirps,
wherein the controller is configured to sum the K chirps by summing the K simultaneous chirps of the distinct combination of K chirps to produce the symbol.

12. The apparatus of claim 10, wherein the M chirps include a basic chirp and M−1 chirps that represent respective cyclic shifts of the basic chirp.

13. The apparatus of claim 10, wherein:
the M chirps are represented by corresponding ones of M indexes;
the mappings include mappings of the distinct values to corresponding ones of distinct combinations of K indexes taken from the M indexes, such that each of the distinct values is mapped to a corresponding one of the distinct combinations of K indexes;
the controller is configured to select by selecting a distinct combination of K indexes among the distinct combinations of K indexes that is mapped to the distinct value based on the mappings; and
the controller is further configured to, prior to summing the K chirps, access the distinct combination of K chirps using the distinct combination of K indexes.

14. A method comprising:
storing mappings of distinct values of an information signal to corresponding ones of distinct combinations of K chirps taken from M chirps that are different from each other, where M>K>=1;
receiving a modulated version of a symbol that represents a distinct value among the distinct values as a summation of the K chirps of a distinct combination of K chirps among the distinct combinations of K chirps;
dechirping the modulated version of the symbol to recover a dechirped signal that retains information contained in the symbol;
processing the dechirped signal to produce an indication of the distinct combination of K chirps; and
based on the mappings, demapping the indication of the distinct combination of K chirps to the distinct value.

15. The method of claim 14, wherein the M chirps include a basic chirp and M−1 chirps that represent respective cyclic shifts of the basic chirp.

16. The method of claim 14, wherein the summation of the K chirps represents a summation of the K chirps time-aligned to be simultaneous with each other.

17. The method of claim 14, wherein:
the M chirps are represented by corresponding ones of M indexes;
the mappings include mappings of the distinct values to corresponding ones of distinct combinations of K indexes taken from the M indexes, such that each of the distinct values is mapped to a corresponding one of the distinct combinations of K indexes;
the processing includes processing the dechirped signal to produce the indication as a distinct combination of K indexes among the distinct combinations of K indexes that is mapped to the distinct value; and
the demapping includes demapping the distinct combinations of K indexes to the distinct values based on the mappings.

18. The method of claim 17, wherein:
the M chirps include a basic chirp and M−1 chirps that represent respective cyclic shifts of the basic chirp; and
the processing further includes:
multiplying the dechirped signal by a complex conjugate of the basic chirp to produce a resulting signal;
generating a Discrete Fourier Transform (DFT) of the resulting signal, the DFT including complex DFT amplitudes in respective frequency bins of the DFT; and
processing the complex DFT amplitudes with the complex conjugate of the basic chirp to produce the distinct combination of K indexes.

19. The method of claim 18, wherein the processing the complex DFT amplitudes includes:
successively determining indexes of the distinct combination of K indexes using a recursive algorithm that operates on the DFT amplitudes and the complex conjugate of the basic chirp.

20. The method of claim 19, wherein the recursive algorithm is given by:

$$\hat{l}_K = \mathrm{argmax}_l \left| x_0^*[l]R[l] + \sum_{m=1}^{K-1} x_0^*[\hat{l}_m]R[\hat{l}_m] \right|,$$

where
$x_0^*$ is the complex conjugate of the basic chirp,
$\hat{l}_K$ represents the distinct combination of K indexes to be determined,
l represents a current index of the K indexes to be determined by the recursive algorithm,
$\hat{l}_m$ represents one or more previous indexes determined by the recursive algorithm, and
R(l) represents a complex DFT amplitude indexed by index l.

* * * * *